US012586151B2

(12) United States Patent
Eble et al.

(10) Patent No.: US 12,586,151 B2
(45) Date of Patent: Mar. 24, 2026

(54) FRAME RATE EXTRAPOLATION

(71) Applicant: Apple Inc., Cupertino, CA (US)

(72) Inventors: Tobias Eble, Sunnyvale, CA (US); Nitin Nandakumar, Sunnyvale, CA (US); Hariprasad Puthukkootil Rajagopol, Sunnyvale, CA (US); Thomas Post, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/437,298

(22) PCT Filed: Mar. 19, 2020

(86) PCT No.: PCT/US2020/023543
§ 371 (c)(1),
(2) Date: Sep. 8, 2021

(87) PCT Pub. No.: WO2020/191147
PCT Pub. Date: Sep. 24, 2020

(65) Prior Publication Data
US 2022/0180473 A1 Jun. 9, 2022

Related U.S. Application Data

(60) Provisional application No. 62/821,593, filed on Mar. 21, 2019.

(51) Int. Cl.
*G06T 3/4007* (2024.01)
*H04N 7/01* (2006.01)

(52) U.S. Cl.
CPC ......... *G06T 3/4007* (2013.01); *H04N 7/0135* (2013.01)

(58) Field of Classification Search
None
See application file for complete search history.

(56) References Cited

U.S. PATENT DOCUMENTS 9,747,726 B2    8/2017   Williams et al.
9,894,298 B1 *  2/2018   Solh ......................... H04N 9/64
(Continued)

FOREIGN PATENT DOCUMENTS

WO           99/51029 A2    10/1999

OTHER PUBLICATIONS

PCT International Search Report and Written Opinion dated Jul. 30, 2020, International Application No. PCT/US2020/023543, pp. 1-10.

*Primary Examiner* — Aaron M Richer
(74) *Attorney, Agent, or Firm* — Fernando & Partners, LLP

(57) ABSTRACT

In one implementation, a method of frame rate extrapolation is performed by a device including one or more processors, non-transitory memory, a scene camera, and a display. The method includes capturing, using the scene camera, an image of a scene. The method includes displaying, on the display, the image of the scene at a first time. The method includes generating an extrapolated image by transforming, using the one or more processors, the image of the scene based on movement of the device, wherein the extrapolated image includes a first area including a first plurality of pixels having respective first pixel values based on a single depth and a second area including a second plurality of pixels having respective second pixel values based on a plurality of depths. The method includes displaying, on the display, the extrapolated image at a second time after the first time.

20 Claims, 8 Drawing Sheets

(56) References Cited

U.S. PATENT DOCUMENTS

| | | | |
|---|---|---|---|
| 10,129,523 B2 | 11/2018 | Michail et al. | |
| 2013/0063571 A1* | 3/2013 | Ishii | G06T 5/50 |
| | | | 348/47 |
| 2014/0176591 A1 | 6/2014 | Klein et al. | |
| 2014/0333718 A1* | 11/2014 | Chang | H04N 23/64 |
| | | | 348/36 |
| 2015/0310665 A1* | 10/2015 | Michail | G06F 3/013 |
| | | | 345/419 |
| 2017/0091906 A1* | 3/2017 | Liang | G06T 7/11 |
| 2017/0213388 A1 | 7/2017 | Margolis et al. | |
| 2017/0237974 A1* | 8/2017 | Samec | H04N 13/122 |
| | | | 348/53 |
| 2017/0374343 A1* | 12/2017 | Boulton | H04N 13/117 |
| 2019/0333263 A1* | 10/2019 | Melkote Krishnaprasad | |
| | | | G06F 3/011 |
| 2020/0098186 A1* | 3/2020 | Xue | H04N 21/6587 |

* cited by examiner

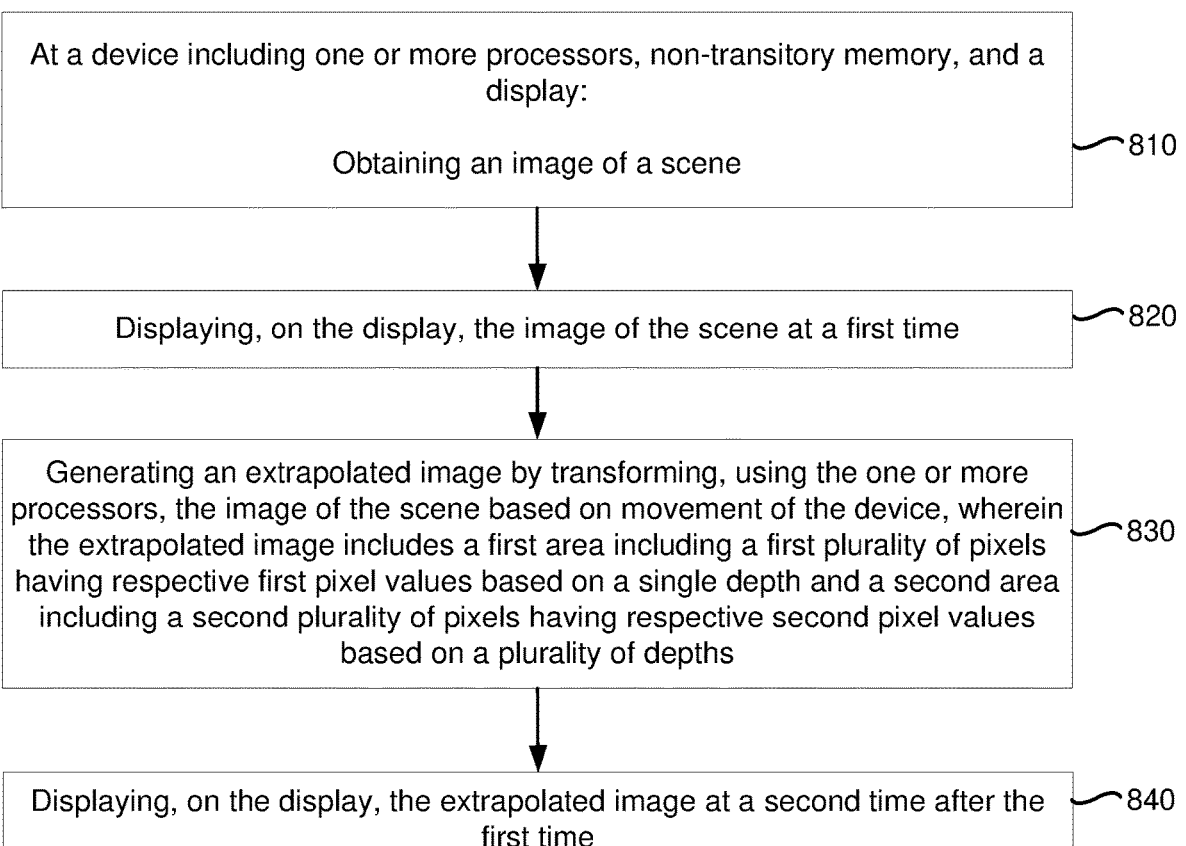

800

At a device including one or more processors, non-transitory memory, and a display:

Obtaining an image of a scene                                                              810

Displaying, on the display, the image of the scene at a first time                         820

Generating an extrapolated image by transforming, using the one or more processors, the image of the scene based on movement of the device, wherein the extrapolated image includes a first area including a first plurality of pixels having respective first pixel values based on a single depth and a second area including a second plurality of pixels having respective second pixel values based on a plurality of depths                                                             830

Displaying, on the display, the extrapolated image at a second time after the first time        840

Figure 8

FRAME RATE EXTRAPOLATION

CROSS-REFERENCES TO RELATED APPLICATIONS

This application is the national phase entry of Intl. Patent App. No. PCT/US2020/023543, filed on Mar. 19, 2020, which claims priority to U.S. Provisional Patent App. No. 62/821,593, filed on Mar. 21, 2019, which are both hereby incorporated by reference in their entireties.

TECHNICAL FIELD

The present disclosure generally relates to frame rate extrapolation and, in particular, to systems, methods, and devices for frame rate extrapolation in enhanced reality settings.

BACKGROUND

Various examples of electronic systems and techniques for using such systems in relation to various enhanced reality technologies are described.

A physical setting refers to a world with which various persons can sense and/or interact without use of electronic systems. Physical settings, such as a physical park, include physical elements, such as, for example, physical wildlife, physical trees, and physical plants. Persons can directly sense and/or otherwise interact with the physical setting, for example, using one or more senses including sight, smell, touch, taste, and hearing.

An enhanced reality (ER) setting, in contrast to a physical setting, refers to an entirely (or partly) computer-produced setting that various persons, using an electronic system, can sense and/or otherwise interact with. In ER, a person's movements are in part monitored, and, responsive thereto, at least one attribute corresponding to at least one virtual object in the ER setting is changed in a manner that is consistent with one or more physical laws. For example, in response to an ER system detecting a person looking upward, the ER system may adjust various audio and graphics presented to the person in a manner consistent with how such sounds and appearances would change in a physical setting. Adjustments to attribute(s) of virtual object(s) in an ER setting also may be made, for example, in response to representations of movement (e.g., voice commands).

A person may sense and/or interact with an ER object using one or more senses, such as sight, smell, taste, touch, and sound. For example, a person may sense and/or interact with objects that create a multi-dimensional or spatial acoustic setting. Multi-dimensional or spatial acoustic settings provide a person with a perception of discrete acoustic sources in multi-dimensional space. Such objects may also enable acoustic transparency, which may selectively incorporate audio from a physical setting, either with or without computer-produced audio. In some ER settings, a person may sense and/or interact with only acoustic objects.

Virtual reality (VR) is one example of ER. A VR setting refers to an enhanced setting that is configured to only include computer-produced sensory inputs for one or more senses. A VR setting includes a plurality of virtual objects that a person may sense and/or interact with. A person may sense and/or interact with virtual objects in the VR setting through a simulation of at least some of the person's actions within the computer-produced setting, and/or through a simulation of the person or her presence within the computer-produced setting.

Mixed reality (MR) is another example of ER. An MR setting refers to an enhanced setting that is configured to integrate computer-produced sensory inputs (e.g., virtual objects) with sensory inputs from the physical setting, or a representation of sensory inputs from the physical setting. On a reality spectrum, an MR setting is between, but does not include, a completely physical setting at one end and a VR setting at the other end.

In some MR settings, computer-produced sensory inputs may be adjusted based on changes to sensory inputs from the physical setting. Moreover, some electronic systems for presenting MR settings may detect location and/or orientation with respect to the physical setting to enable interaction between real objects (i.e., physical elements from the physical setting or representations thereof) and virtual objects. For example, a system may detect movements and adjust computer-produced sensory inputs accordingly, so that, for example, a virtual tree appears fixed with respect to a physical structure.

Augmented reality (AR) is an example of MR. An AR setting refers to an enhanced setting where one or more virtual objects are superimposed over a physical setting (or representation thereof). As an example, an electronic system may include an opaque display and one or more imaging sensors for capturing video and/or images of a physical setting. Such video and/or images may be representations of the physical setting, for example. The video and/or images are combined with virtual objects, wherein the combination is then displayed on the opaque display. The physical setting may be viewed by a person, indirectly, via the images and/or video of the physical setting. The person may thus observe the virtual objects superimposed over the physical setting. When a system captures images of a physical setting, and displays an AR setting on an opaque display using the captured images, the displayed images are called a video pass-through. Alternatively, a transparent or semi-transparent display may be included in an electronic system for displaying an AR setting, such that an individual may view the physical setting directly through the transparent or semi-transparent displays. Virtual objects may be displayed on the semi-transparent or transparent display, such that an individual observes virtual objects superimposed over a physical setting. In yet another example, a projection system may be utilized in order to project virtual objects onto a physical setting. For example, virtual objects may be projected on a physical surface, or as a holograph, such that an individual observes the virtual objects superimposed over the physical setting.

An AR setting also may refer to an enhanced setting in which a representation of a physical setting is modified by computer-produced sensory data. As an example, at least a portion of a representation of a physical setting may be graphically modified (e.g., enlarged), so that the modified portion is still representative of (although not a fully-reproduced version of) the originally captured image(s). Alternatively, in providing video pass-through, one or more sensor images may be modified in order to impose a specific viewpoint different than a viewpoint captured by the image sensor(s). As another example, portions of a representation of a physical setting may be altered by graphically obscuring or excluding the portions.

Augmented virtuality (AV) is another example of MR. An AV setting refers to an enhanced setting in which a virtual or computer-produced setting integrates one or more sensory inputs from a physical setting. Such sensory input(s) may include representations of one or more characteristics of a physical setting. A virtual object may, for example, incorporate a color associated with a physical element captured by imaging sensor(s). Alternatively, a virtual object may adopt characteristics consistent with, for example, current weather conditions corresponding to a physical setting, such as weather conditions identified via imaging, online weather information, and/or weather-related sensors. As another example, an AR park may include virtual structures, plants, and trees, although animals within the AR park setting may include features accurately reproduced from images of physical animals.

Various systems allow persons to sense and/or interact with ER settings. For example, a head mounted system may include one or more speakers and an opaque display. As another example, an external display (e.g., a smartphone) may be incorporated within a head mounted system. The head mounted system may include microphones for capturing audio of a physical setting, and/or image sensors for capturing images/video of the physical setting. A transparent or semi-transparent display may also be included in the head mounted system. The semi-transparent or transparent display may, for example, include a substrate through which light (representative of images) is directed to a person's eyes. The display may also incorporate LEDs, OLEDs, liquid crystal on silicon, a laser scanning light source, a digital light projector, or any combination thereof. The substrate through which light is transmitted may be an optical reflector, holographic substrate, light waveguide, optical combiner, or any combination thereof. The transparent or semi-transparent display may, for example, transition selectively between a transparent/semi-transparent state and an opaque state. As another example, the electronic system may be a projection-based system. In a projection-based system, retinal projection may be used to project images onto a person's retina. Alternatively, a projection-based system also may project virtual objects into a physical setting, for example, such as projecting virtual objects as a holograph or onto a physical surface. Other examples of ER systems include windows configured to display graphics, headphones, earphones, speaker arrangements, lenses configured to display graphics, heads up displays, automotive windshields configured to display graphics, input mechanisms (e.g., controllers with or without haptic functionality), desktop or laptop computers, tablets, or smartphones.

In order to present an ER setting, image data may be provided to an electronic device at a frame rate. The image data may relate to a VR setting or an MR setting (including, for example, one or more virtual objects and/or an image of a real physical setting). However, it may be desirable to present the ER setting at a higher frame rate, thus requiring interpolation and/or extrapolation. In various implementations, extrapolation is performed based on movement of the electronic device in the real physical setting.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 8 is a flowchart representation of a method of frame rate extrapolation in accordance with some implementations.

Figure 1:
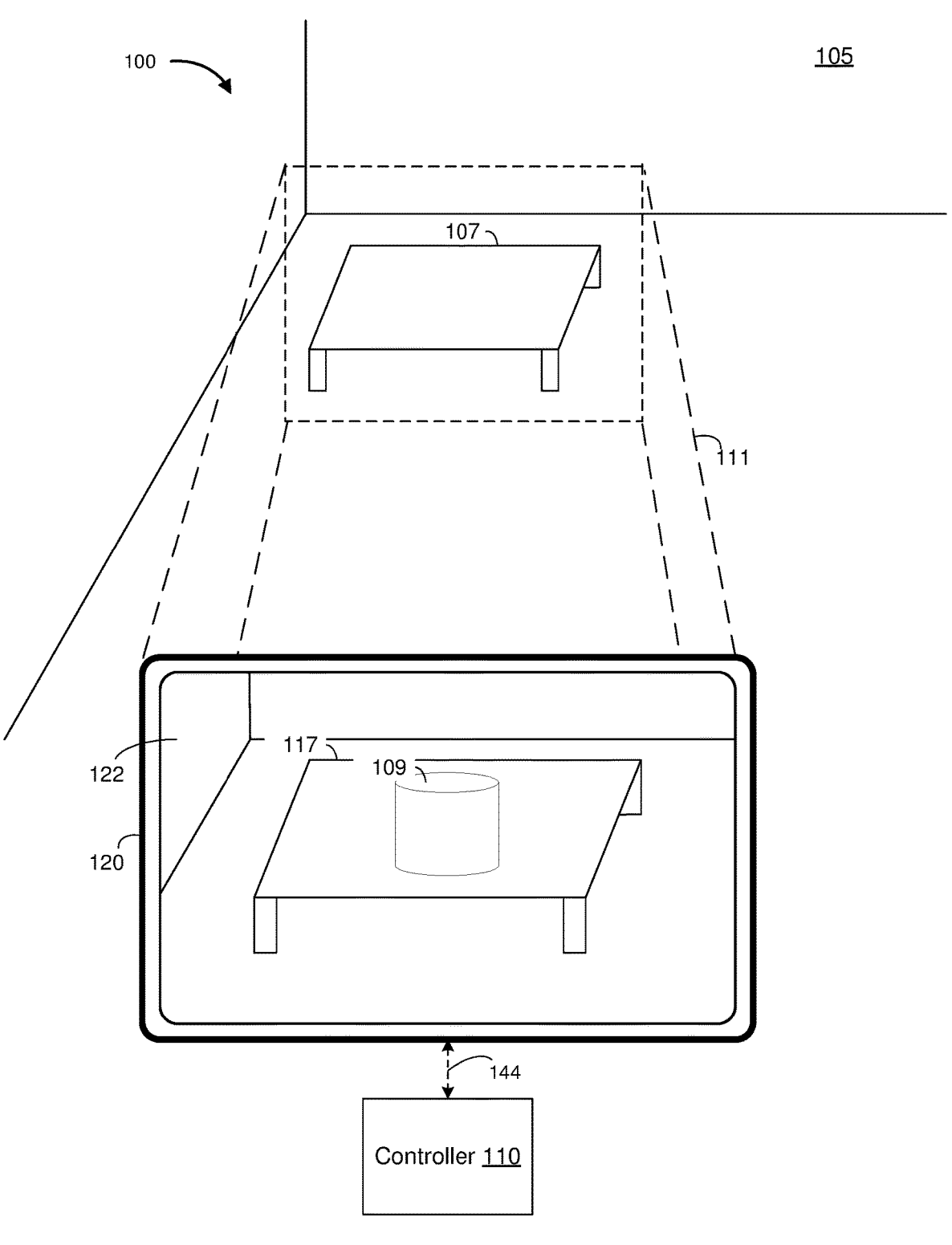
FIG. 1 is a block diagram of an example operating setting in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for frame rate extrapolation. In various implementations, a method is performed by a device including one or more processors, non-transitory memory, a scene camera, and a display. The method includes obtaining an image of a scene. The method includes displaying, on the display, the image of the scene at a first time. The method includes generating an extrapolated image by transforming, using the one or more processors, the image of the scene based on movement of the device, wherein the extrapolated image includes a first area including a first plurality of pixels having respective first pixel values based on a single depth and a second area including a second plurality of pixels having respective second pixel values based on a plurality of depths. The method includes displaying, on the display, the extrapolated image at a second time after the first time.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, in order to present an ER setting, image data may be provided to an electronic device at a frame rate (e.g., 30 frames a second). However, it may be desirable to present the ER setting at a higher frame rate, thus requiring interpolation and/or extrapolation. In various implementations, extrapolation is performed based on movement of the electronic device.

FIG. 1 is a block diagram of an example operating setting 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating setting 100 includes a controller 110 and an electronic device 120.

In some implementations, the controller 110 is configured to manage and coordinate an ER experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some implementations, the controller 110 is communicatively coupled with the electronic device 120 via one or more wired or wireless communication channels 144 (e.g., BLU-ETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the ER experience to the user. In some implementations, the electronic device 120 includes a suitable combination of software, firmware, and/or hardware. According to some implementations, the electronic device 120 presents, via a display 122, ER content to the user while the user is physically present within the scene 105 that includes a table 107 within the field-of-view 111 of the electronic device 120. As such, in some implementations, the user holds the electronic device 120 in his/her hand(s). In some implementations, while providing augmented reality (AR) content, the electronic device 120 is configured to display an AR object (e.g., an AR cylinder 109) and to enable video pass-through of the scene 105 (e.g., including a representation 117 of the table 107) on a display 122. The electronic device 120 is described in greater detail below with respect to FIG. 3.

According to some implementations, the electronic device 120 provides an ER experience to the user while the user is virtually and/or physically present within the scene 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more ER displays provided to display the ER content. For example, in various implementations, the electronic device 120 encloses the field-of-view of the user. In some implementations, the electronic device 120 is a handheld device (such as a smartphone or tablet) configured to present ER content, and rather than wearing the electronic device 120, the user holds the device with a display directed towards the field-of-view of the user and a camera directed towards the scene 105. In some implementations, the handheld device can be placed within an enclosure that can be worn on the head of the user. In some implementations, the electronic device 120 is replaced with an ER chamber, enclosure, or room configured to present ER content in which the user does not wear or hold the electronic device 120.

Figure 2:
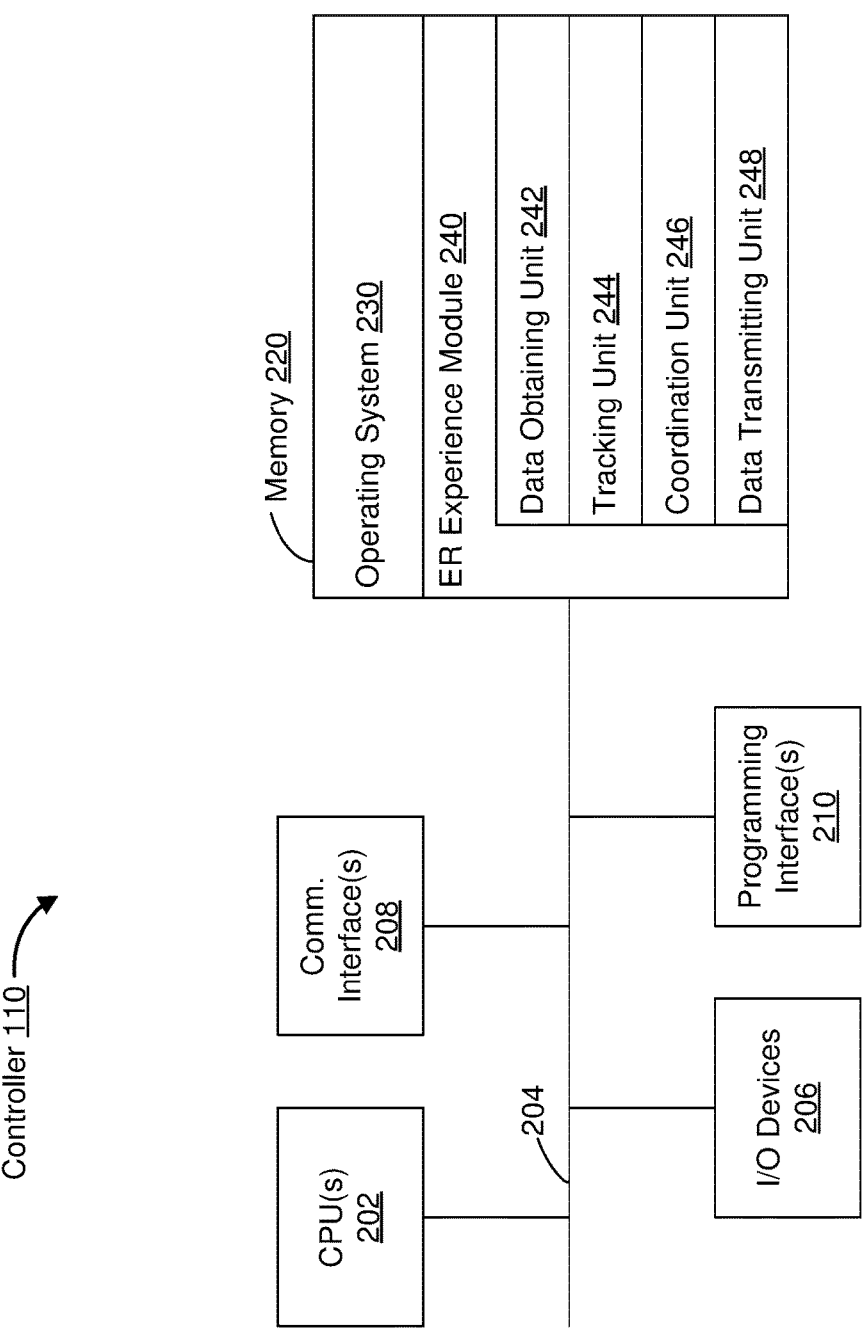
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an ER experience module 240.

The operating system 230 includes procedures for handling various basic system services and for performing hardware dependent tasks. In some implementations, the ER experience module 240 is configured to manage and coordinate one or more ER experiences for one or more users (e.g., a single ER experience for one or more users, or multiple ER experiences for respective groups of one or more users). To that end, in various implementations, the ER experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the scene 105 and to track the position/location of at least the electronic device 120 with respect to the scene 105 of FIG. 1. To that end, in various implementations, the tracking unit 244 includes instructions and/or logic therefor, and heuristics and metadata therefor.

In some implementations, the coordination unit 246 is configured to manage and coordinate the ER experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
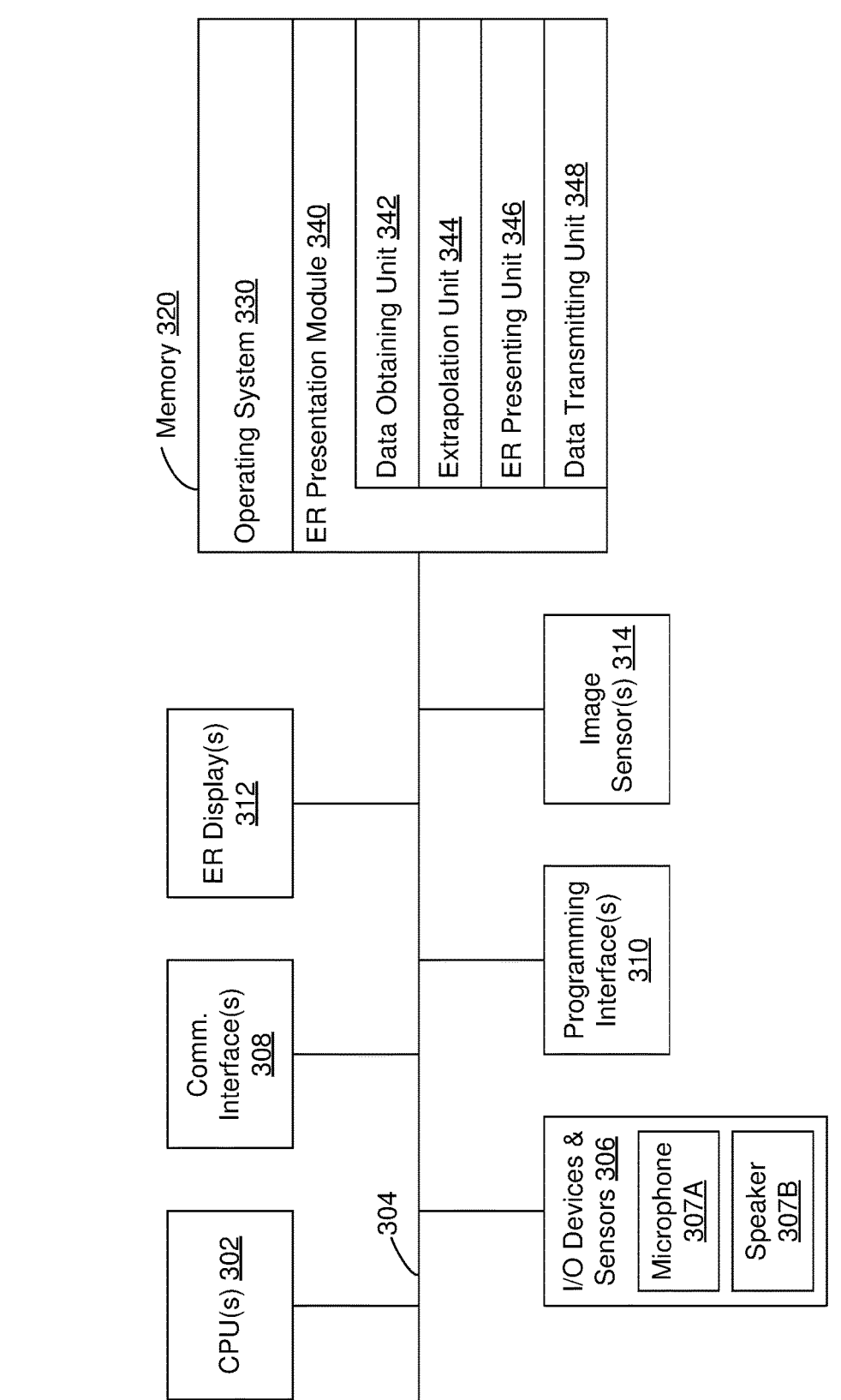
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more ER displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones 307A, one or more speakers 307B, a haptics engine, one or more depth sensors (e.g., a structured light, a time-of-flight, or the like), and/or the like.

In some implementations, the one or more ER displays 312 are configured to provide the ER experience to the user. In some implementations, the one or more ER displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more ER displays 312 correspond to diffractive, reflective, polarized, holographic, etc. waveguide displays. For example, the electronic device 120 includes a single ER display. In another example, the electronic device 120 includes an ER display for each eye of the user.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an ER presentation module 340.

The operating system 330 includes procedures for handling various basic system services and for performing hardware dependent tasks. In some implementations, the ER presentation module 340 is configured to present ER content to the user via the one or more ER displays 312. To that end, in various implementations, the ER presentation module 340 includes a data obtaining unit 342, an extrapolation unit 344, an ER presentation unit 346, and a data transmitting unit 348.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the extrapolation unit 344 is configured to perform frame rate extrapolation of a video stream based on movement of the electronic device 120. To that end, in various implementations, the extrapolation unit 344 includes instructions and/or logic therefor, and heuristics and metadata therefor.

In some implementations, the ER presenting unit 346 is configured to present frame rate upscaled ER content via the one or more ER displays 312. To that end, in various implementations, the ER presenting unit 346 includes instructions and/or logic therefor, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the extrapolation unit 344, the ER presenting unit 346, and the data transmitting unit 348 are shown as residing on a single device (e.g., the electronic device 120 of FIG. 1), it should be understood that in other implementations, any combination of the data obtaining unit 342, the extrapolation unit 344, the ER presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
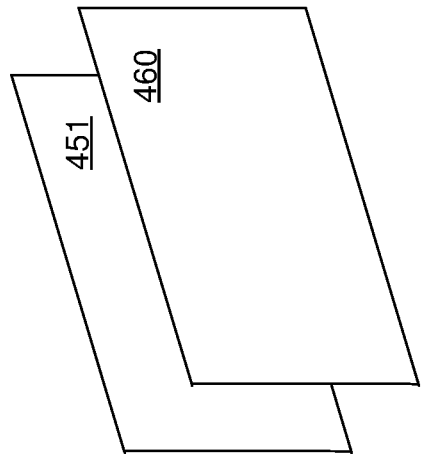
FIG. 4A illustrates an example of frame rate upscaling at an electronic device via interpolation.

FIG. 4A illustrates an example of frame rate upscaling at an electronic device via interpolation. The electronic device receives a video stream including a first series of frames (including a first frame 401 and a second frame 402) at a first frame rate. The electronic device generates an interpolated video stream including a second series of frames at a second frame rate higher than the first frame rate. Further, the electronic device displays the interpolated video stream. The interpolated video stream is generated by generating, between each pair of adjacent frames of the first series of frames, an interpolated frame. For example, the interpolated video stream includes the first frame 401, the second frame 402, and an interpolated frame 410 between the first frame 401 and the second frame 402.

Although interpolation allows for many different types of frame rate upscaling algorithms, interpolation introduces a high amount of latency making it unsuitable for ER applications. In particular, the second frame 402 must be received before the interpolated frame 410 can be generated and displayed.

Figure 4B:
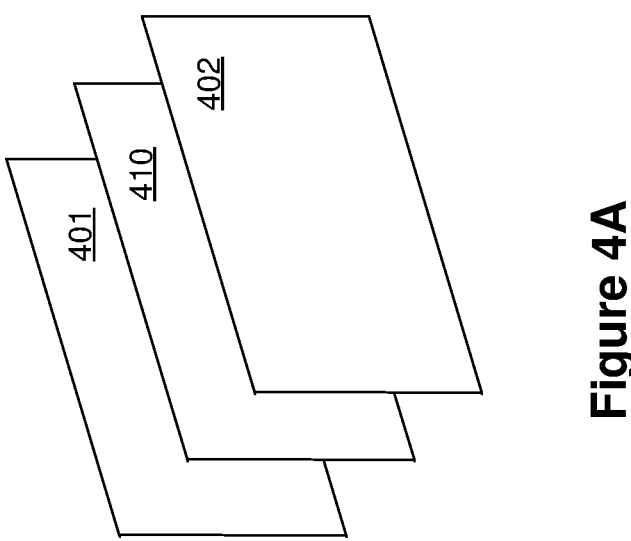
FIG. 4B illustrates an example of frame rate upscaling at an electronic device via extrapolation.

FIG. 4B illustrates an example of frame rate upscaling at an electronic device via extrapolation. The electronic device receives a video stream including a first series of frames (including a first frame 451) at a first frame rate. The electronic device generates an extrapolated video stream including a second series of frames at a second frame rate higher than the first frame rate. Further, the electronic device displays the extrapolated video stream. The extrapolated video stream is generated by generating, after each of the first series of frames, an extrapolated frame. For example, the extrapolated video stream includes the first frame 451 and an extrapolated frame 460 following the first frame 451.

Although extrapolation is, in various implementations, more difficult, e.g., more computationally expensive, extrapolation introduces less latency than interpolation making it suitable for ER applications. In particular, in various implementations, the electronic device generates and displays the extrapolated frame 460 before receiving a second frame of the video stream following the first frame 451.

In various implementations, the interpolated frame 410 is based on the first frame 401 and the second frame 402. In contrast, the extrapolated frame 460 is based on the first frame 451 but not a second frame following the first frame. However, in various implementations, the extrapolated frame 460 is further based on motion data indicative of motion of the electronic device. In various implementations, the motion data indicates a translation and/or rotation of the electronic device.

Figure 5:
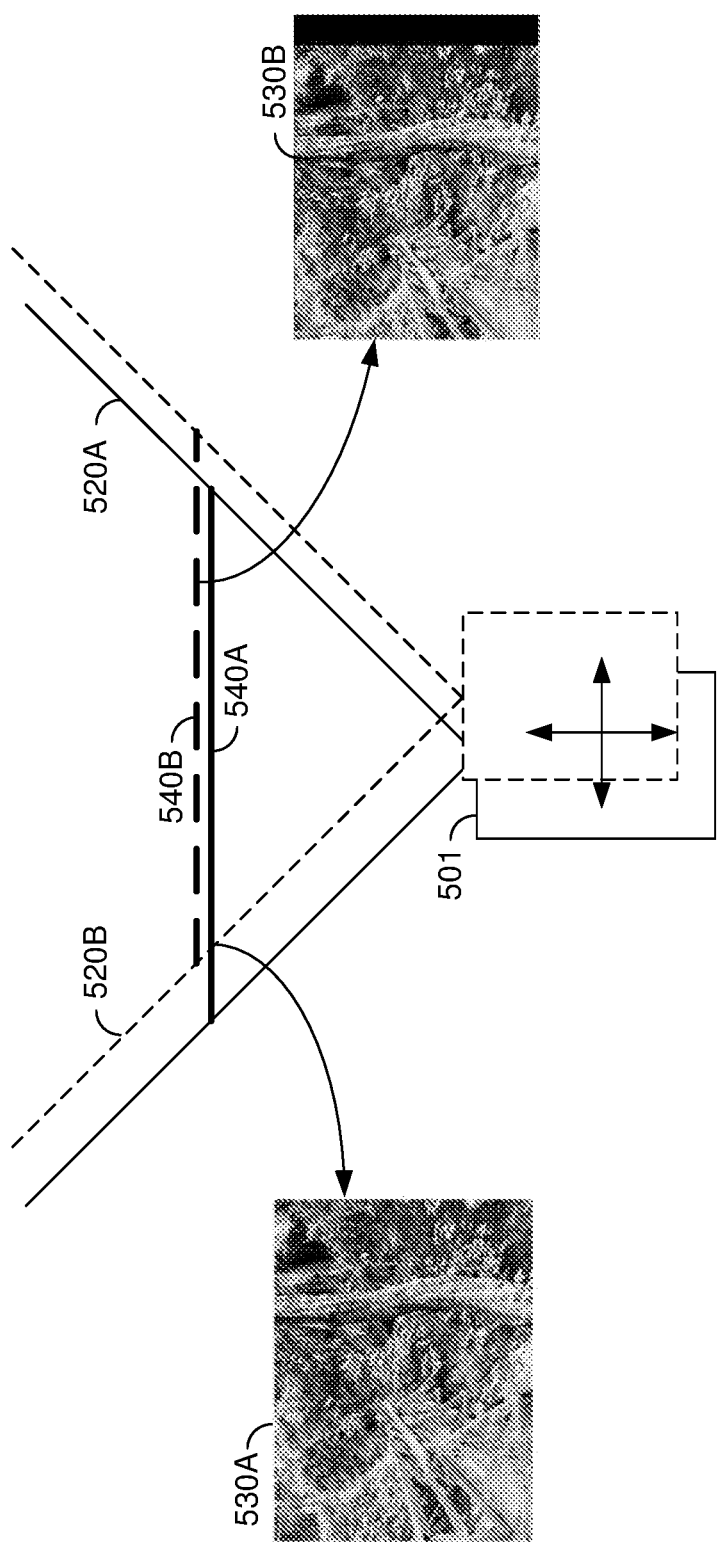
FIG. 5 illustrates a frame rate extrapolation based on translation of an electronic device.

FIG. 5 illustrates a frame rate extrapolation based on translation of an electronic device 501. At a first time (illustrated by solid lines), the electronic device 501 is located at a first location and has a first field of view 520A. A first frame 530A is received by the electronic device and displayed at the first time. The first frame 530A corresponds to a first projection plane 540A.

The electronic device 501 obtains motion data corresponding to a translation of the electronic device from a first location (at the first time) to a second location (corresponding to a second time). In various implementations, the electronic device 501 is a head-mounted device, and the translation of the electronic device 501 corresponds to translation of the head of a user wearing the electronic device 501. In various implementations, the motion data is obtained using one or more of an inertial measurement unit (IMU), an accelerometer, or a gyroscope.

At the second location, the electronic device 501 has a second field of view 520B different than the first field of view 520A. The electronic device 501 generates an extrapolated frame 530B corresponding to a second projection plane 540B translated from the first projection plane 540A according to the translation of the electronic device 501. Further, the electronic device 501 displays the extrapolated frame 530B at the second time.

Figure 6:
FIG. 6 illustrates a frame rate extrapolation based on rotation of the electronic device.

FIG. 6 illustrates a frame rate extrapolation based on rotation of the electronic device 501. At a first time (illustrated by solid lines), the electronic device 501 has a first orientation and has a first field of view 620A. A first frame 630A is received by the electronic device 501 and displayed at the first time. The first frame 630A corresponds to a first projection plane 640A.

The electronic device 501 obtains motion data corresponding to a rotation of the electronic device 501 from a first orientation (at the first time) to a second orientation (corresponding to a second time). In various implementations, the electronic device 501 is a head-mounted device, and the rotation of the electronic device 501 corresponds to rotation of the head of a user wearing the electronic device 501. In various implementations, the motion data is obtained using one or more of an inertial measurement unit (IMU), an accelerometer, or a gyroscope.

At the second orientation, the electronic device 501 has a second field of view 620B different than the first field of view 620A. The electronic device 501 generates an extrapolated frame 630B corresponding to a second projection plane 640B rotated as compared to the first projection plane 640A according to the rotation of the electronic device 501. Further, the electronic device 501 displays the extrapolated frame 630B at the second time.

In various implementations, the electronic device generates an extrapolated frame using a homographic transformation of the first frame.

For example, in various implementations, forward extrapolation is used in which, for each pixel of the first frame at a pixel location, a new pixel location for the pixel in the extrapolated frame is determined.

In various implementations, the new pixel location is determined according to the following equation in which $x_c$ and $y_c$ are the pixel location in the first frame, $x_t$ and $y_t$ are the new pixel location in the extrapolated frame, $T_f$ is a 3×3 forward transformation matrix based on the motion data indicative of translation and/or rotation of the electronic device, d is a depth, and d' is an unused transformed depth:

$$\begin{bmatrix} x_t \\ y_t \\ d' \end{bmatrix} = T_f \cdot \begin{bmatrix} x_c \\ y_c \\ d \end{bmatrix}$$

In various implementations, the new pixel location is determined using the above equation for each pixel in the first frame. In various implementations, the new pixel location is determined using the above equation for less than each pixel of the first frame (e.g., for the four corners of the first frame with linear interpolation applied to determine other new pixel locations).

Using the new pixel locations in the extrapolated frame and the pixel values of the pixels of the first frame, the electronic device generates the extrapolated frame using interpolation or other techniques.

As another example, in various implementations, backward extrapolation is used in which, for each pixel of the extrapolated frame at a pixel location, a corresponding pixel location for the pixel in the first frame is determined.

In various implementations, the corresponding pixel location is determined according to the following equation in which $x_t$ and $y_t$ are the pixel location in the extrapolated frame, $x_c$ and $y_c$ are the corresponding pixel location in the first frame, $T_b$ is a 3×3 backward transformation matrix based on the motion data indicative of translation and/or rotation of the electronic device, d is a depth, and d' is an unused transformed depth:

$$\begin{bmatrix} x_c \\ y_c \\ d' \end{bmatrix} = T_b \cdot \begin{bmatrix} x_t \\ y_t \\ d \end{bmatrix}$$

In various implementations, the corresponding pixel location is determined using the above equation for each pixel in the extrapolated frame. In various implementations, the corresponding pixel location is determined using the above equation for less than each pixel of the extrapolated frame (e.g., for the four corners of the extrapolated frame with linear interpolation applied to determine other corresponding pixel locations).

Using the corresponding pixel locations in the first frame and the pixel values of the pixels of the first frame, the electronic device generates the extrapolated frame using interpolation or other techniques.

In various implementations, the electronic device determines a plurality of pixel depths corresponding to the plurality of pixel locations. The pixel depths are indicative of the distance between the electronic device and an object (or a portion thereof) represented by the pixel at the corresponding pixel location. In various implementations, the pixel depths are determined using scene understanding, VIO (visual inertial odometry), a depth sensor, and/or depth by stereo.

Thus, in various implementations, the depth d in the homographic transformation is chosen as a constant value based on the plurality of pixel depths in determining each new pixel location of the extrapolated frame (or each corresponding pixel location of the first frame). For example, in various implementations, the depth d in the homographic transformation is chosen as the pixel depth at the pixel location where the user is looking based on eye tracking. In various implementations, the depth d in the homographic transformation is a variable value based on the pixel location and the pixel depth at the pixel location.

Where a single depth is used in the homographic transformation (referred to a planar homography), the homographic transformation is one-to-one (e.g., each pixel location of the first frame maps to a unique new pixel location in the extrapolated frame and/or each pixel location of the extrapolated frame maps to a unique corresponding pixel location in the first frame). The extrapolated frame is undistorted for objects at that single depth, with distortion increasing for objects at increasing distance from the single depth. By selecting the single depth as the depth of the object the user is looking at, this creates distortion in the user's periphery where the user may be less sensitive to distortion. However, frame rate extrapolation for a series of frames introduces a flickering in the periphery to which the user may be sensitive even in the user's periphery.

Where a variable depth is used in the homographic transformation (referred to as per-pixel homography), the homographic transformation is not one-to-one (e.g., multiple pixel locations of the first frame map to the same new pixel location of the extrapolated frame and/or a pixel location of the extrapolated frame maps to no pixel location of first frame), resulting in duplication and/or holes in the extrapolated frame. Duplication may be mitigated by averaging and holes may be mitigated by interpolation, each introducing distortion to which the user may be sensitive, both in the areas where the user is looking and the user's periphery.

Figure 7:
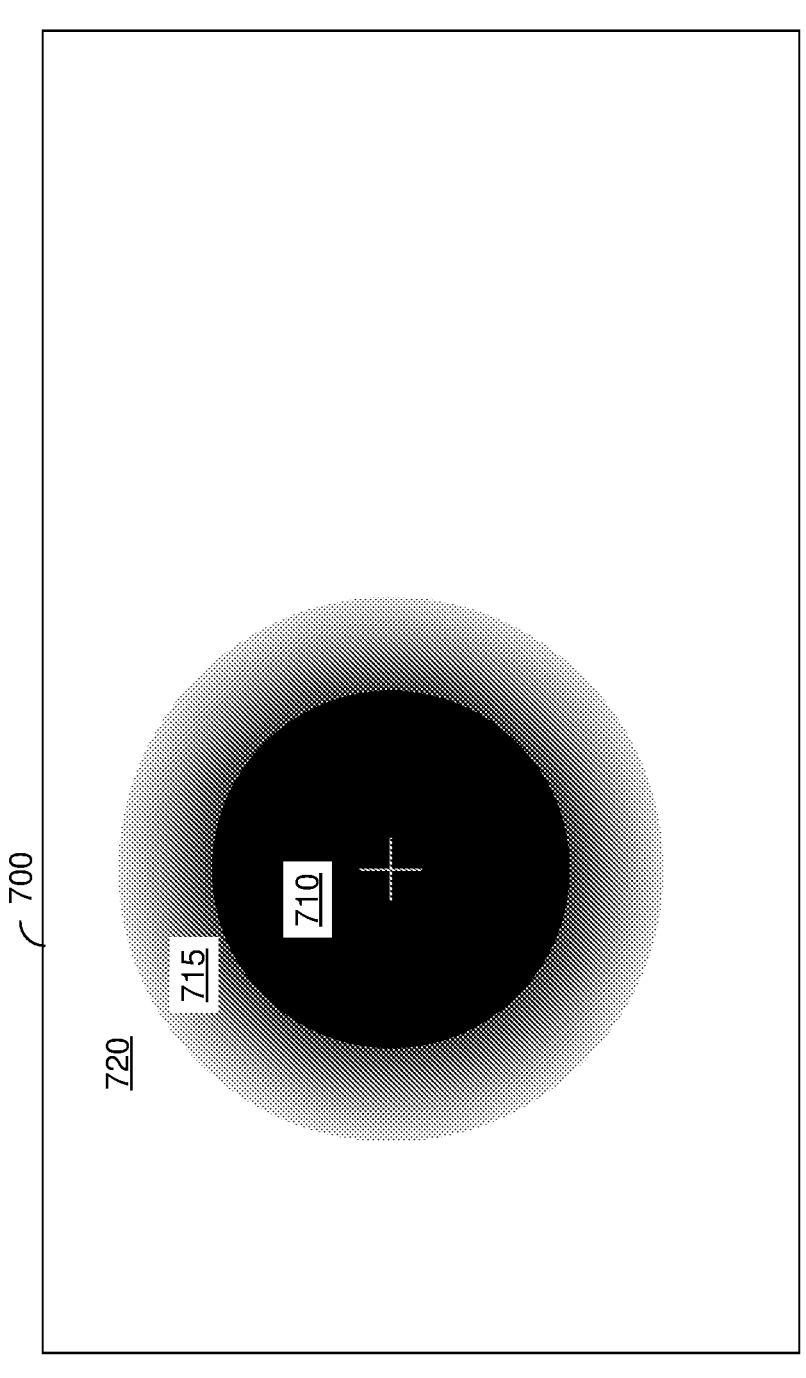
FIG. 7 illustrates a first frame according to some implementations.

Accordingly, in various implementations, a combination of planar homography and per-pixel homography is implemented. FIG. 7 illustrates a first frame 700 according to some implementations. For pixels within a first region 710 of the first frame 700 surrounding a gaze point of the user, planar homography is implemented to generate an extrapolated frame. For pixels within a second region 720 of the first frame 700 surrounding the first region 710, per-pixel homography is implemented to generate the extrapolated frame. For pixels within a transition region 715 between the first region 710 and the second region 720, both planar homography and per-pixel homography are implemented to generate the extrapolated frame. In various implementations, the size of the first region 710 and the size and shape of the transition region 715 are defined by a blending function. The blending function takes, as an input, a distance between from the gaze point and the pixel location and provides, as an output a homography weighting between 0 and 1. In various implementations, the blending function is a decreasing function (but not necessarily a strictly decreasing function) of the distance from the gaze point. In various implementations, the blending function is 1 in the first region 710, 0 in the second region 720, and decreases from 1 to 0 within the transition region 715.

Thus, in various implementations, using forward extrapolation, the new pixel location in the extrapolated frame is determined according to the following equation in which $x_c$ and $y_c$ are the pixel location in the first frame, $x_t$ and $y_t$ are the new pixel location in the extrapolated frame, $x_g$ and $y_g$ are the pixel location of a pixel the user is looking at, $T_f$ is a 3×3 forward transformation matrix based on the motion data indicative of translation and/or rotation of the electronic device, $s(x,y)$ is the blending function at pixel location $(x,y)$, $d(x,y)$ is the pixel depth at a pixel location $(x,y)$, and d' is an unused transformed depth:

$$\begin{bmatrix} x_t \\ y_t \\ d' \end{bmatrix} = s(x_c, y_c) \cdot T_f \cdot \begin{bmatrix} x_c \\ y_c \\ d(x_g, y_g) \end{bmatrix} + (1 - s(x_c, y_c)) \cdot T_f \cdot \begin{bmatrix} x_c \\ y_c \\ d(x_c, y_c) \end{bmatrix}$$

Equivalently, $$\begin{bmatrix} x_t \\ y_t \\ d' \end{bmatrix} = T_f \cdot \begin{bmatrix} x_c \\ y_c \\ s(x_c, y_c) \cdot d(x_g, y_g) + (1 - s(x_c, y_c)) \cdot d(x_c, y_c) \end{bmatrix}$$

Also, in various implementations, using backward extrapolation, the corresponding pixel location in the first frame is determined according to the following equation in which $x_t$ and $y_t$ are the pixel location in the extrapolated frame, $x_c$ and $y_c$ are the corresponding pixel location in the first frame, $x_g$ and $y_g$ are the pixel location of a pixel the user is looking at, $T_b$ is a 3×3 forward transformation matrix based on the motion data indicative of translation and/or rotation of the electronic device, $s(x,y)$ is the blending function at pixel location $(x,y)$, $d(x,y)$ is the pixel depth at a pixel location $(x,y)$, and d' is an unused transformed depth:

$$\begin{bmatrix} x_c \\ y_c \\ d' \end{bmatrix} = s(x_t, y_t) \cdot T_b \cdot \begin{bmatrix} x_t \\ y_t \\ d(x_g, y_g) \end{bmatrix} + (1 - s(x_t, y_t)) \cdot T_b \cdot \begin{bmatrix} x_t \\ y_t \\ d(x_t, y_t) \end{bmatrix}$$

Equivalently, $$\begin{bmatrix} x_c \\ y_c \\ d' \end{bmatrix} = T_b \cdot \begin{bmatrix} x_t \\ y_t \\ s(x_t, y_t) \cdot d(x_g, y_g) + (1 - s(x_t, y_t)) \cdot d(x_t, y_t) \end{bmatrix}$$

Thus, in various implementations, the electronic device performs planar frame extrapolation around the user's gaze point to avoid local artifacts and uses per-pixel extrapolation in the user's periphery to avoid flickering.

FIG. 8 is a flowchart representation of a method 800 of frame rate extrapolation in accordance with some implementations. In various implementations, the method 800 is performed by a device with one or more processors, non-transitory memory, a scene camera, and a display (e.g., the electronic device 120 of FIG. 3). In some implementations, the method 800 is performed by processing logic, including hardware, firmware, software, or a combination thereof. In some implementations, the method 800 is performed by a processor executing instructions (e.g., code) stored in a non-transitory computer-readable medium (e.g., a memory).

Briefly the method 800 includes obtaining an image of a scene, displaying the image of the scene at a first time, transforming the image of the scene to generate an extrapolated image, and displaying the extrapolated image at a second time after the first time. In various implementations, the method 800 includes obtaining a subsequent image of the scene, displaying the subsequent image of the scene at a third time after the second time, transforming the subsequent image of the scene to generate a subsequent extrapolated image, and displaying the subsequent extrapolated image at a fourth time after the third time. Thus, frame rate extrapolation is achieved.

The method 800 begins, in block 810, with the device obtaining an image of a scene. In various implementations, the device captures the image of the scene using a scene camera. In various implementations, the device renders the image of the scene using one or more processors (or receives a rendered scene via a communications interface). Thus, in various implementations, the image is captured, rendered, or a combination of the two. The method 800 continues, in block 820, with the device displaying, on the display, the image of the scene at a first time.

The method 800 continues, in block 830 with the device generating an extrapolated image by transforming, using the one or more processors, the image of the scene based on movement of the device (e.g., the scene camera of the device). In various implementations, the extrapolated image includes a first area including a first plurality of pixels having respective first pixel values based on a single depth and a second area including a second plurality of pixels having respective second pixel values based on a plurality of depths. In various implementations, the extrapolated image includes a transition area disposed between the first area and the second area.

In various implementations, transforming the image of the scene based on movement of the device includes obtaining motion data indicative of a translation and/or a rotation of the device and transforming the image of the scene based on the motion data.

In various implementations, the motion data is indicative of a translation and/or a rotation of the device from the first time (at which the image of the scene is displayed in block 820) to a second time (at which the extrapolated image is displayed in block 840, as described below). In various implementations, the motion data is based on a measured motion of the device from the first time to the second time. In various implementations, the motion data is based on a predicted motion of the device from the first time to the second time, e.g., based on motion of the device prior to the first time or between the first time and the second time. In various implementations, the motion data is obtained using one or more of an inertial measurement unit (IMU), an accelerometer, or a gyroscope of the device.

In various implementations, transforming the image of the scene based on movement of the device includes performing a homographic transformation of the image of the scene based on movement of the device.

In various implementations, generating the extrapolated image includes determining, for various pixel locations, respective transformed pixel locations using a transformation matrix based on the motion of the device. In various implementations, the transformed pixel locations are further determined based on a depth d.

In various implementations, for each pixel location, a respective transformed pixel location is determined. In various implementations, the transformed pixel location is determined according to the following equation in which $x_1$ and $y_1$ are the pixel location, $x_2$ and $y_2$ are the transformed pixel location, T is a 3×3 transformation matrix based on the movement of the device, d is a depth, and d' is an unused transformed depth:

$$\begin{bmatrix} x_2 \\ y_2 \\ d' \end{bmatrix} = T \cdot \begin{bmatrix} x_1 \\ y_1 \\ d \end{bmatrix}$$

In various implementations, the device determines a plurality of pixel depths corresponding to the plurality of pixel locations. The pixel depths are indicative of the distance between the device (e.g., the scene camera of the device) and an object (or a portion thereof) represented by the pixel at the corresponding pixel location. In various implementations, the pixel depths are determined using scene understanding, VIO (visual inertial odometry), a depth sensor, and/or depth by stereo.

In various implementations, the depth d is constant in the first area and variable in the second area. In various implementations, the constant depth in the first area is the pixel depth at the pixel location at which the user is looking based on eye tracking. In various implementations, the variable depth in the second area is the pixel depth at the pixel location. Thus, in various implementations, the depth d is independent of pixel location in the first area and dependent on pixel location in the second area.

Accordingly, in various implementations, the first area includes a gaze point of the user. In particular, in various implementations, the first area is centered at the gaze point of the user. Further, the second area includes the periphery of the user. In various implementations, the second area surrounds the first area.

The first area of the extrapolated image is based on a planar homographic transform of the image of the scene and the second area of the extrapolated image is based on a per-pixel homographic transform of the image of the scene. As noted above, in various implementations, the extrapolated image includes a transition area between the first area and the second area. In various implementations, the transition area of the image of the scene is based on a blending of the planar homographic transform and the per-pixel homographic transform.

Using the transformed pixel locations and the pixel values of the pixels of the image of the scene, the device generates the extrapolated frame using interpolation or other techniques.

For example, in various implementations using a forward homographic transform, for each pixel of the image of the scene at a pixel location in the image of the scene, a new pixel location is determined in the extrapolated image. In various implementations, the new pixel location is determined according to the following equation in which $x_c$ and $y_c$ are the pixel location in the image of the scene, $x_t$ and $y_t$ are the new pixel location in the extrapolated image, $T_f$ is a 3×3 forward transformation matrix based on the movement of the device, d is a depth, and d' is an unused transformed depth:

$$\begin{bmatrix} x_t \\ y_t \\ d' \end{bmatrix} = T_f \cdot \begin{bmatrix} x_c \\ y_c \\ d \end{bmatrix}$$

In various implementations, the new pixel location is determined using the above equation for each pixel in the image of the scene. In various implementations, the new pixel location is determined using the above equation for less than each pixel of the image of the scene (e.g., for the pixels at the four corners of the image of the scene or pixels at grid points in the image of the scene with linear interpolation applied to determine other new pixel locations).

Using the new pixel locations in the extrapolated image and the pixel values of the pixels of the image of the scene, the device generates the extrapolated frame using interpolation or other techniques.

As another example, in various implementations using a backward homographic transform, for each pixel of the extrapolated image at a pixel location in the extrapolated image, a corresponding pixel location for the pixel in the image of the scene is determined.

In various implementations, the corresponding pixel location is determined according to the following equation in which $x_t$ and $y_t$ are the pixel location in the extrapolated image, $x_c$ and $y_c$ are the corresponding pixel location in the image of the scene, $T_b$ is a 3×3 backward transformation matrix based on the movement of the device, d is a depth, and d' is an unused transformed depth:

$$\begin{bmatrix} x_c \\ y_c \\ d' \end{bmatrix} = T_b \cdot \begin{bmatrix} x_t \\ y_t \\ d \end{bmatrix}$$

In various implementations, the corresponding pixel location is determined using the above equation for each pixel in the extrapolated image. In various implementations, the corresponding pixel location is determined using the above equation for less than each pixel of the extrapolated image (e.g., for the pixels at the four corners of the extrapolated image or pixels at grid points in the extrapolated image with linear interpolation applied to determine other corresponding pixel locations).

Using the corresponding pixel locations in the image of the scene and the pixel values of the pixels of the image of the scene, the device generates the extrapolated image using interpolation or other techniques.

The method 800 continues, at block 840, with the device displaying, on the display, the extrapolated image at a second time after the first time.

In various implementations, the method 800 repeats, thereby performing frame rate extrapolation of a video stream.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a device including one or more processors, non-transitory memory, and a display:

obtaining a single image of a scene;

displaying, on the display, the single image of the scene at a first time;

generating an extrapolated image by transforming, using the one or more processors, the single image of the scene, wherein the extrapolated image includes:

a first area including a gaze point of a user and including a first plurality of pixels having respective first pixel values determined based on a single depth and movement of the device, wherein the first area of the extrapolated image is based on a planar homographic transform of the single image of the scene, a second area surrounding the first area and including a second plurality of pixels having respective second pixel values determined based on a plurality of depths and the movement of the device, wherein the second area of the extrapolated image is based on a per-pixel homographic transform of the single image of the scene, and a transition area between the first area and the second area and including a third plurality of pixels having respective third pixel values determined based on a blending of a first pixel in the first area and a second pixel in the second area, wherein the blending of the transition area is based on a blending of the planar homographic transform and the per-pixel homographic transform; and displaying, on the display, the extrapolated image at a second time after the first time.

2. The method of claim 1, wherein transforming the single image of the scene includes obtaining motion data indicative of a translation and/or a rotation of the device and transforming the single image of the scene based on the motion data.

3. The method of claim 2, wherein the motion data is indicative of a translation and/or a rotation of the device from the first time to the second time.

4. The method of claim 3, wherein the motion data is based on a predicted motion of the device from the first time to the second time.

5. The method of claim 1, wherein transforming the single image of the scene includes performing a homographic transformation of the single image of the scene based on the movement of the device.

6. The method of claim 1, wherein generating the extrapolated image includes determining, for various pixel locations, respective transformed pixel locations using a transformation matrix based on the movement of the device.

7. The method of claim 6, wherein a respective transformed pixel location is determined by applying the transformation matrix to a vector including the pixel location and a depth.

8. The method of claim 7, wherein the depth is constant in the first area and variable in the second area.

9. The method of claim 7, wherein the depth is independent of the pixel location in the first area and dependent on the pixel location in the second area.

10. The method of claim 1, wherein a size of the first area is determined based on a blending function.

11. The method of claim 10, wherein the blending function takes, as an input, a distance between from the gaze point and a pixel location and provides, as an output, a homography weighting.

12. The method of claim 1, wherein the first area is centered at the gaze point of the user.

13. The method of claim 1, wherein the device includes a camera, the method further comprising:

obtaining the single image via the camera; and providing the single image from the camera to the one or more processors for generating the extrapolated image.

14. The method of claim 1, wherein a size and shape of the transition area are determined based on a blending function.

15. The method of claim 1, wherein generating the extrapolated image comprises performing backward extrapolation that, for each pixel of the extrapolated image at a location, determines a corresponding location in the image using a backward transformation matrix.

16. The method of claim 1, wherein generating the extrapolated image comprises performing forward extrapolation that, for each pixel of the single image at a location, determines a corresponding location in the extrapolated image using a forward transformation matrix.

17. A device comprising:
a display;
a non-transitory memory; and
one or more processors to:
   obtain a single image of a scene;
   display, on the display, the single image of the scene at a first time;
   generate an extrapolated image by transforming, using the one or more processors, the single image of the scene, wherein the extrapolated image includes:
      a first area including a gaze point of a user and including a first plurality of pixels having respective first pixel values determined based on a single depth and movement of the device, wherein the first area of the extrapolated image is based on a planar homographic transform of the single image of the scene,
      a second area surrounding the first area and including a second plurality of pixels having respective second pixel values determined based on a plurality of depths and the movement of the device, wherein the second area of the extrapolated image is based on a per-pixel homographic transform of the single image of the scene, and
      a transition area between the first area and the second area and including a third plurality of pixels having respective third pixel values determined based on a blending of a first pixel in the first area and a second pixel in the second area, wherein the blending of the transition area is based on a blending of the planar homographic transform and the per-pixel homographic transform; and display, on the display, the extrapolated image at a second time after the first time.

18. The device of claim 17, wherein the first area is centered on the gaze point of the user.

19. The device of claim 17, wherein a size of the first area is determined based on a blending function.

20. A non-transitory memory storing one or more programs, which, when executed by one or more processors of a device with a display, cause the device to:
   obtain a single image of a scene;
   display, on the display, the single image of the scene at a first time;
   generate an extrapolated image by transforming, using the one or more processors, the single image of the scene, wherein the extrapolated image includes:
      a first area including a gaze point of a user and including a first plurality of pixels having respective first pixel values determined based on a single depth and movement of the device, wherein the first area of the extrapolated image is based on a planar homographic transform of the single image of the scene,
      a second area surrounding the first area and including a second plurality of pixels having respective second pixel values determined based on a plurality of depths and the movement of the device, wherein the second area of the extrapolated image is based on a per-pixel homographic transform of the single image of the scene, and
      a transition area between the first area and the second area and including a third plurality of pixels having respective third pixel values determined based on a blending of a first pixel in the first area and a second pixel in the second area, wherein the blending of the transition area is based on a blending of the planar homographic transform and the per-pixel homographic transform; and
   display, on the display, the extrapolated image at a second time after the first time.

* * * * *